3,161,016
STRAINED MONOCYCLOHEXANE HYDRO-
CARBONS AS HIGH ENERGY FUELS
John O. Smith, Swampscott, and K. Warren Easley, Wayland, Mass., assignors, by mesne assignments, to Monsanto Research Corporation, Everett, Mass., a corporation of Delaware
No Drawing. Filed Oct. 19, 1960, Ser. No. 63,476
7 Claims. (Cl. 60—35.4)

This invention relates to high energy fuels. More particularly, this invention relates to methods of developing thrust and to methods of operating reaction type power plants. This invention especially contemplates a high energy fuel composition comprising a strained monocyclohexane hydrocarbon as an essential ingredient.

The development of reaction type power plants has been accompanied by the requirement for developing fuels suitable for use in such engines. In a reaction type power plant, fuel and an oxidizing agent are admixed under suitable conditions in suitable proportions whereby the fuel is oxidized or burned in a pressure-restraining combustion chamber to form a mass of high temperature gases which comprise the fuel combustion products and any excess oxidizing agent. The high temperature gases are exhausted from the combustion chamber at high velocity to product thrust in accordance with the law of momentum. In a jet propulsion type engine, such as a rocket, ram-jet, turbo jet, or pulse-jet engine, exhaustion of the high temperature gases is directed in a rearward direction to produce a true jet propulsion. In a turbine type engine, such as a gas turbine or a turbo-prop engine, the exhaustion of high temperature gases is directed into a turbine which drives a propeller or other mechanical means for developing a forward thrust. Reaction type power plants may be used in widely different types of vehicles, such as in space ships, aircraft, boats, guided missiles, automobiles and the like.

Heretofore, it was believed that many hydrocarbons did not vary sufficiently in their burning characteristics to make a material difference in the operation of reaction type power plants. Although these power plants may be operated under many conditions with substantially any fuel, other conditions of operations may encounter operational difficulties and require fuels having particular properties. One difficulty which has been encountered in power plants for high-speed vehicles is that many fuels lack thermal stability, resulting in the formation of insoluble gum and other deposits which hamper performance. At high speeds, particularly supersonic speeds in aircraft, the fuel supply must serve to absorb the aerodynamic heat which builds up faster than can be dissipated to the atmosphere. A refrigeration system is not suitable in such applications because of weight and volume limitations. Under some conditions, the fuel will be heated to a temperature as high as 500° F. or higher but the presently available JP-4 fuel is thermally stable to a temperature of only about 400° F. Therefore, it is desirable to have a fuel which is thermally stable at a temperature of at least as high as 500° F.

Another serious disadvantage of the prior art fuels is the low heat of combustion of such fuels. Aircraft, generally, and particularly military aircraft, are being designed for higher and higher speeds requiring higher energy level fuels. The fuel must not only have a high energy level on a weight basis, or high B.t.u./lb., but also a high energy level on a volume basis, or high B.t.u./gal., since wing sections are being made thinner in order to reduce the drag and space for storage of fuel is limited. Thus, aircraft are often volume limited as well as weight limited for the storage of fuel. Aircraft are particularly volume limited using the currently available JP-6 high energy fuel which has a heat of combustion of 18,400 B.t.u./lb. on a weight basis but a heat of combustion of only 119,500 B.t.u./gal. on a volume basis. Therefore, it is very desirable to provide a high energy fuel having a high heat of combustion on a volume basis, preferably greater than 120,000 B.t.u./gal., and at the same time obtain the other characteristics necessary for a good fuel of this type.

An object of this invention is to provide high energy fuel compositions for use in reaction type power plants.

Another object of this invention is to provide improved methods of developing thrust.

Another object of this invention is to provide improved methods of operating reaction type power plants, particularly jet-propulsion type engines, including rocket, ram-jet, turbo-jet, and pulse-jet engines, and turbine type engines, including turbo-prop and gas turbine engines.

Other aspects, objects and advantages of this invention will be apparent from a consideration of the accompanying disclosure and the appended claims.

According to the present invention, there are provided high energy fuel compositions comprising, as an essential ingredient, a strained monocyclohexane hydrocarbon, preferably a strained monocyclohexane hydrocarbon of the formula

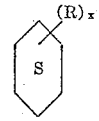

wherein R is an alkyl radical and $x$ is an integer of from 4 to 6, inclusive, at least two R groups being located on adjacent carbon atoms.

Also, according to the present invention, there are provided improved methods of developing thrust, said methods comprising oxidizing a high energy fuel composition comprising, as an essential ingredient, a strained monocyclohexane hydrocarbon, preferably a strained monocyclohexane hydrocarbon as defined above, with an oxidizing agent in a reaction chamber to produce a mass of high temperature gases and exhausting said gases from said reaction chamber in a manner so as to develop a large amount of thrust.

Also, according to the present invention, there are provided improved methods of operating reaction type power plants, said methods comprising injecting a stream of an oxidizing agent and a stream of a fuel composition comprising, as an essential ingredient, a strained monocyclohexane hydrocarbon, preferably a strained monocyclohexane hydrocarbon as defined above, into the combustion chamber of said reaction type power plant in such proportion as to produce a combustible mixture, subjecting said combustible mixture to combustion, and exhausting the resulting gases from said combustion chamber so as to impart thrust thereto.

Preferably, the strained monocyclohexane hydrocarbons of this invention are substituted with at least 4 alkyl groups and at least 2 of these alkyl groups are located on adjacent carbon atoms. In addition, 2 alkyl groups may be located on the same carbon atom; however, there is still an alkyl group located on an adjacent carbon atom. Although the monocyclohexane hydrocarbons may contain as many as 12 alkyl groups, the preferred hydrocarbons contain no more than 6 alkyl groups but at least as many as 4 alkyl groups. Preferably, each alkyl group contains from 1 to 6 carbon atoms. In this specification and claims strained monocyclohexane hydrocarbons may be defined as those containing at least 4 alkyl groups with at least 2 alkyl groups on adjacent carbon atoms. Thus, there is steric strain wherein the atoms in the hydrocarbon molecules are packed so closely together that the chemical bonds are stretched.

Examples of some suitable polyalkylated cyclohexane hydrocarbons for use in the high energy fuel compositions of this invention include:

1,2,4,6-tetraethylcyclohexane
1,2,4,5-tetramethylcyclohexane
1,2,3,4-tetraisopropylcyclohexane
1,3,4,5-tetrahexylcyclohexane
1,2,3,4,5,6-hexamethylcyclohexane
1,1,2,4-tetra-tert-butylcyclohexane
1,1,2,4,6-penthahexylcyclohexane
1,1,2,2,4,4-hexapropylcyclohexane
1,1,3,3,4,4-hexamethylcyclohexane The strained monocyclohexane hydrocarbons of this invention may be prepared by the Friedel-Crafts alkylation of benzene with an olefin followed by hydrogenation at an elevated temperature using a nickel catalyst. Many of the strained monocyclohexane hydrocarbons of this invention are commercially available as by-products in the production of alkyl benzenes.

The advantages, desirability and usefulness of the present invention are illustrated by the following examples.

EXAMPLE 1

In this example, 1,2,3,4,5,6-hexaethylcyclohexane, which was obtained commercially as a by-product of ethyl benzene manufacture, was subjected to inspection tests in order to show from thermal and physical properties that a typical strained monocyclohexane hydrocarbon is suitable in the operation of a reaction type power plant. The results of these tests are given in Table I.

Table I

THERMAL AND PHYSICAL PROPERTIES OF 1,2,3,4,5,6-HEXAETHYLCYCLOHEXANE FUEL

| | |
|---|---|
| Hydrogen/carbon ratio | 0.168 |
| Luminometer number | 69.6 |
| Freezing point, °F. | −16 |
| Index of refraction, $n_D^{20}$ | 1.4723 |
| Boiling point, °C. | 96° C./1.5 mm. Hg to 110° C./0.65 mm. Hg |
| Density at 99° C. g./ml. | 0.819 |
| Heat of combustion, Btu./lb., net | 18,678 |
| Heat of combustion, Btu./gal., net | 136,868 |
| Viscosity at 99° C., cs. | 2.3 |
| Thermal conductivity, Btu./hr.–ft.$^2$ °F./ft. | |
| at 145.4° F. | 0.0639 |
| at 219.2° F. | 0.0610 |
| Thermal decomposition, temp., °F. | 651 |
| Heat capacity, Btu./lb. °F. at 104° F. | 0.502 |

Heats of combusion were obtained with a Parr oxygen bomb calorimeter on both a weight and a volume basis following the ASTM D-240-57T proceudre. The freezing point was determined following the ASTM D-1477-57T procedure. Specific heat was measured using a comparison calorimeter as described by Spear in Aanl. Chem. 24, 938 (1952) and by Porter and Johnson in Preprints of General Papers, Division of Petroleum Chemistry, American Chemical Society, vol. 3, No. 1, 15 (1958). Thermal conductivites were measured by the hot-wire method described by Cecil and Munch in Ind. Eng. Chem., 48, 437 (1956) and Cecil Koerner, and Munch in Ind. Eng. Chem. Data Sheets, 2, 54 (1957). Density was determined at a temperature of 99° C. using a Lipkin bicapillary pycnometer. Viscosity at 99° C. was measured using the standard Cannon-Fenske Capillary Viscosimeter following the ASTM D-445 procedure. The luminometer number was obtained using a luminometer manufactured by the Erdco Engineering Corporation. The procedure for determining the luminometer number involved burning the fuel in a luminosity lamp and measuring the temperature rise above the lamp for various luminosity readings. From a graph of luminosity readings versus lamp temperature rise, the temperature rise for a luminosity reading of 45 was obtained. The same procedure was repeated to obtain temperature rise values at a luminosity reading of 45 for isooctane and tetralin which serve as reference points of 100 and 0, respectively. The luminometer number was then obtained by dividing the difference between the temperature rise of the test fuel and the temperature rise of the tetralin by the difference in the temperature rise of isoctane and the temperature rise of tetralin multiplied by 100.

The thermal decomposition temperature was obtained using a high temperature, high pressure isoteniscope which consists of a monel bomb capped at one end and connected to a precision pressure gauge by a monel diaphragm. The test fuel was heated within the bomb to an elevated temperature under high pressure and the temperature measured at which the fuel decomposed and evolved gas as determined by the changes of pressure within the bomb. In this method, the formation of deposits in the decomposition reaction is not measured because some fuels may start to decompose to gas before forming deposits.

EXAMPLE 2

In this example, fuel specifications were determined for the 1,2,3,4,5,6-hexaethylcyclohexane fuel of this invention in accordance with the procedure of ASTM D-86-56P. These results are reported in Table II.

Table II

Distillation Specification of 1,2,3,4,5,6-Hexaethylcyclohexane Fuel

| | |
|---|---|
| Distillation: | |
| Initial boiling, °F. | 505 |
| 10% fuel evaporated, °F. | 524 |
| 20% fuel evaporated, °F. | 526 |
| 50% fuel evaporated, °F. | 529.5 |
| 90% fuel evaporated, °F. | 537.5 |
| End point, °F. | 557 |
| Sum of initial boiling and 50% fuel evaporated | 1034.5 |
| Volume data: | |
| Residue, percent | 1.2 |
| Distillation loss, percent | 0.8 |

The above examples indicate that the strained monocyclohexane hydrocarbons are very suitable for use in various reaction type power plants. These particular compounds have very high heats of combustion on both a weight basis and a volume basis and may therefore be very advantageously employed in jet-propulsion type engines and turbine type engines where extremely high energy content fuels are desired on either a weight basis or a volume basis. Another advantage in using these hydrocarbons in a reaction type power plant fuel is the fact that these hydrocarbons have a very low freezing point and, therefore, can be handled satisfactorily at low temperatures.

The strained monocyclohexane hydrocarbons of this invention are also characterized by unusually high thermal stabilities when employed as fuels for reaction type power plants. This factor is of importance not only in the actual combustion taking place in the engine but also in the fuel system prior to the burning step. For example, it is necessary in high speed aircraft to use the fuel reservoir to absorb the aerodynamic heat which builds up faster than can be dissipated to the atmosphere and thereby the fuel is heated to a temperature of 500° F. or higher. If degradation of the fuel occurs, gum and coke are deposited in the fuel system, thereby seriously hampering the smooth flow of fuel from the reservoir into the combustion zone.

In operating reaction type power plants with the new hydrocarbon fuels of this invention, the fuel and an oxidizing agent are admixed together to form a combustible mixture which is then ignited either by a spark ignition device or by the burning fuel itself. The fuel compositions of this invention are not limited to use with particular oxidizing agents and almost any oxidizing agent known to those skilled in the art can be used. Ordinarily, in most aircraft applications using turbo-prop, turbo-jet, pulse-jet, and gas turbine engines, the oxidizing agent is air which is compressed in either a mechanical compressor or aerodynamically. Also, in automotive and in ship applications, the oxidizing agent will ordinarily be air. In contrast to these applications, the oxidizing agent will usually be liquid oxygen or another chemical oxidizer, for example, fuming nitric acid, hydrogen peroxide, fluorine or the like in missile and rocket applications. In some applications, a mixture of oxidizing agents will also be useful.

The fuel compositions of the present invention may be blended with other materials such as gasoline and kerosene, mixtures of gasoline and kerosene, other aviation fuels, and with the presently available jet fuels to produce an improved fuel composition. More particularly, the fuel described herein may be added to the present aliphatic hydrocarbon fuels having a heat of combustion of about 112,000 Btu./gal. to raise the overall heat of combustion thereof to at least about 120,000 Btu./gal. Moreover, the fuels described herein may be used in combination with fuel additives to improve various characteristics of the fuel, including liquid viscosity, burning characteristics and the like.

In the operation of reaction type power plants using the fuel compositions of this invention, the fuel and oxidizing agent are charged into the combustion chamber in a proportion which gives rise to a combustible mixture. Where the oxidizing agent is air, the fuel-air ratio will ordinarily be maintained between 0.005 and 0.15. The particular fuel-air ratio used will be dependent not only upon the power requirements at the moment but also upon the nature of the engine. Thus, turbo-jet engines are preferably operated on a fuel-air ratio of about 0.01 to 0.03 whereas ram-jet engines are usually operated at a fuel-air ratio of 0.03 to 0.07.

Reasonable variation and modification of the invention as described are possible, the essence of which is that there have been provided (1) high energy fuel compositions containing strained monocyclohexane hydrocarbons as essential active ingredients, (2) improved methods of developing thrust, and (3) methods of operating reaction type power plants.

We claim:

1. The method of developing thrust in a reaction chamber which comprises oxidizing in said chamber a hydrocarbon fuel comprising essentially a strained alicyclic hydrocarbon of the formula

where R is alkyl of from 1 to 6 carbon atoms and wherein at least two alkyl are attached to adjacent carbon atoms, to produce a mass of high temperature gases and exhausting said gases from said chamber so as to develop thrust.

2. The method of operating a reaction type power plant comprises injecting into the combustion chamber of said motor an oxidizing agent and a hydrocarbon fuel comprising essentially a strained alicyclic hydrocarbon of the formula

where R is alkyl of from 1 to 6 carbon atoms and wherein at least two alkyl are attached to adjacent carbon atoms, to effect combustion of said fuel and exhausting the resulting gases from said chamber so as to impart a thrust.

3. The method of operating a jet propulsion engine which comprises injecting into the combustion chamber of said engine a stream of an oxidizing agent and a stream of a hydrocarbon fuel composition comprising essentially a strained alicyclic hydrocarbon of the formula

where R is alkyl of from 1 to 6 carbon atoms and wherein at least two alkyl are attached to adjacent carbon atoms, to effect combustion of said fuel and exhausting the resulting gases in a rearward direction so as to impart thrust to said jet-propulsion engine.

4. The method of operating a gas-turbine engine which comprises injecting into the combustion chamber of said engine a stream of an oxidizing agent and a stream of a hydrocarbon fuel composition comprising essentially a strained alicyclic hydrocarbon of the formula

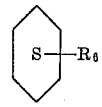

where R is alkyl of from 1 to 6 carbon atoms and wherein at least two alkyl are attached to adjacent carbon atoms, to effect combustion of said fuel and exhausting the resulting gases from said combustion chamber through a turbine to develop motive power.

5. The method of operating a turbo-jet engine which comprises feeding an oxidizing agent and a hydrocarbon fuel comprising essentially a strained alicyclic hydrocarbon of the formula

where R is alkyl of from 1 to 6 carbon atoms and wherein at least two alkyl are attached to adjacent carbon atoms, into the combustion chamber of said engine and effecting combustion of said fuel in said chamber, exhausting the resulting cases from said combustion chamber through a turbine to expand the same and compress the oxidizing agent supplied to said chamber, and passing the resulting gases into the atmosphere by way of a nozzle to impart thrust to said engine.

6. The method of operating a turbo-jet engine which comprises feeding air and a strained alicyclic hydrocarbon of the formula

where R is alkyl of from 1 to 6 carbon atoms and wherein at least two alkyl are attached to adjacent carbon atoms, into the combustion chamber of said engine and burning said hydrocarbon in said chamber, exhausting the resulting gases from said combustion chamber through a turbine to expand the same and compress the air supplied to said chamber, and passing the resulting gases into the atmosphere by way of a nozzle to impart thrust to said engine.

7. The method of operating a turbo-jet engine which comprises feeding air and 1,2,3,4,5,6-hexaethylcyclohexane into the combustion chamber of said engine and burning said hexaethylcyclohexane in said chamber, exhausting the resulting gases from said combustion chamber through a turbine to expand the same and compress the air supplied to said chamber, and passing the resulting gases into the atmosphere by way of a nozzle to impart thrust to said engine.

References Cited in the file of this patent

UNITED STATES PATENTS

| | | |
|---|---|---|
| 2,098,046 | Ipatieff et al. | Nov. 2, 1937 |
| 2,404,100 | Schmerling | July 16, 1946 |
| 2,415,438 | McKinley et al. | Feb. 11, 1947 |
| 2,564,080 | Roebuck et al. | June 29, 1949 |
| 2,698,511 | Britton | Jan. 4, 1955 |
| 2,712,497 | Fox et al. | July 5, 1955 |
| 2,765,617 | Gluesenkamp et al. | Oct. 9, 1956 |
| 2,826,037 | Scott et al. | Mar. 11, 1958 |